Jan. 27, 1959  D. H. GREENWOOD  2,870,987
GATE VALVE AND SEALING MEANS THEREFOR
Filed July 8, 1955

INVENTOR:
Dolphice H. Greenwood
BY
H. D. Stevenson

United States Patent Office 2,870,987
Patented Jan. 27, 1959

2,870,987

GATE VALVE AND SEALING MEANS THEREFOR

Dolphice H. Greenwood, Pasadena, Calif.

Application July 8, 1955, Serial No. 520,820

4 Claims. (Cl. 251—327)

This invention relates generally to valves in which the valve body has spaced, angularly related, annular valve faces and a valving member for engaging between said faces to shut off the flow of fluid through the valve body. Specifically, the invention is directed to an improved sealing means carried by the valving member and compressible between the member and the valve faces to positively seal against leakage of fluid between these components.

While the present sealing means is adaptable in valves of various types, it is herein described, by way of example, as embodied in a gate type valve.

In gate valves wherein a wedge-shaped valving member is employed for shutting off the flow of fluid through the valve, the member is moved to wedging position between the angularly-related valve faces of a pair of seat rings, said valve faces usually being ground and lapped to provide extremely smooth surfaces. Sealing between the tapered faces of the wedge member and the valve body is necessary to prevent leakage of fluid therebetween and this has heretofore presented a major problem in valve design. When metal-to-metal engagement of the lapped faces of the body and wedge are relied upon, leakage may take place due to the occurrence of particles of foreign matter between the faces which may score the faces. Due to such a deleterious condition, compressible sealing rings are commonly employed, said rings being disposed in annular grooves in the sides of the wedge member and engageable with the valve faces of the valve body when the wedge is forced into place. The sealing rings, which are usually made from natural or synthetic rubber, are of the shape of the grooves of the wedge member in which they are located and are of a thickness slightly greater than the depth of the grooves so that they project slightly beyond the tapered sides of the member. Thus, when the wedge member is forced into position to close the valve, its sealing rings are compressed between the member and the annular valve faces of the body to seal therebetween. It is thus seen that the compressed rings provide the sole means for sealing against leakage, the corresponding faces of the body and wedge member being spaced slightly apart.

Such a sealing means has the disadvantage that the rings become distorted as the wedge member is slid relative to the body. Also, due to the relatively wide contact area of the sealing ring, adherence of this ring against the valve face may take place and this may tend to dislodge it from its groove. Moreover, compressing of the ring tends to flatten and elongate it in a transverse direction to cause the outer corners of the groove to cut into the rubber and eventually weaken and shorten the life thereof. Periodic replacement of the rings thus is necessary to maintain the valve in good working order and such frequent servicing of the valve is costly.

In order to obviate the conditions referred to above, I have proposed to provide a sealing means in the nature of an "O-ring" carried by the movable valve member and compressible between the corresponding faces of the member and the valve body. Such a sealing means is disclosed and claimed in my United States Patent No. 2,709,455, dated May 31, 1955, and titled Line Blind Valve. In the patented structure, the O-ring is fitted within a groove of special cross-sectional configuration having inwardly-directed flanges or lips which overlie portions of the O-ring to retain it in place, so as to prevent displacement of the ring during movement of the valving member into and from the valve body. Said O-ring seal is compressed between the valving member and valve face of the body and is somewhat distorted into the groove of trapezium cross-sectional shape. Due to this fact, metal-to-metal contact is effected between the valving member and the spaced, annular valve faces, with the O-rings compressed therebetween. This specific arrangement provides a most effective means for providing a positive leakproof valve.

While the O-ring seal and means for retaining it on the valving member is highly practical and efficient in connection with valves used in systems conveying fluid of low pressures, such as line blind valves, I have determined that an even more positive retaining means for the O-ring seal may be desirable where the latter is used in connection with a high pressure gate valve and carried by the wedge member. It is therefore an object of the present invention to provide, in a gate valve employing a wedge member, an O-ring seal carried by the member and compressible between the member and the annular, inclined valve face of the valve body, the invention embodying a retaining or locking means for anchoring the ring within a groove in the wedge member so as to positively prevent displacement of the O-ring, due to fluid pressure acting thereagainst as the wedge member is being withdrawn from between the valve faces.

Another object of the invention is to provide, in a gate valve, a wedge member having an annular recess in each of its inclined sides, said recess having an inwardly directed lip provided with an inner, frusto-conical surface overlying a part of the bottom surface of the recess, said recess receiving the O-ring and being of a depth less than the cross-sectional diameter of the ring.

Another object of the invention is to provide a sealing means which includes a retainer ring securable in place in the recess and having a frusto-conical, peripheral lip or flange directed outwardly, that is, toward the lip of the recess. By this structure, the two lips cooperate in lightly compressing the O-ring in the annular groove defined by the diametrically outer surface of the recess, the periphery of the retainer ring and the bottom surface of the recess. According to the invention, the recess and the retainer ring, and the lips thereof are so proportioned that the space between the lips is considerably less than the cross-sectional diameter of the O-ring lightly compressed in the groove, so that a small sector of the O-ring projects outwardly beyond the side of the wedge member to engage the valve face. Thus, when the wedge member is forced into valve-closing position the O-ring is compressed further into the groove to form an effective seal and to allow an additional metal-to-metal seal between the ground and lapped valve faces of the wedge member and valve body. Since the O-ring is effectively confined within the annular groove, displacement thereof, due to fluid pressure acting thereagainst, is positively prevented. In addition, since the O-ring is compressed between the bottom of the groove and the valve face of the body, pinching of the ring between the valve faces of the wedge and body is avoided so that the O-ring will remain useful over a very long period of time and servicing of the valve is thus minimized.

A further object of the invention is to provide a seal for the wedge member of a gate valve, and mounting means therefor, which, in addition to being highly practical, is relatively simple in construction, economical to produce and one in which the wedge, O-rings and retainer ring constitute a sub-assembly installable in the valve body as a complete unit so that mounting of the O-rings at the site where the gate valve is installed is unnecessary.

Further objects of the invention will appear from the following description and from the drawing which is intended for the purpose of illustration only, and in which.

Figure 1:
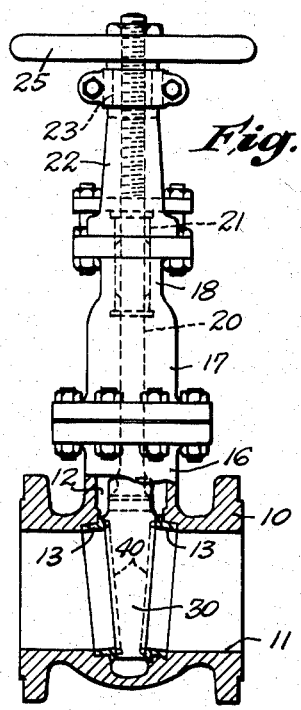
Fig. 1 is a sectional view of a conventional gate valve, showing the present, improved wedge member and sealing means applied to use therein.
Figure 3:
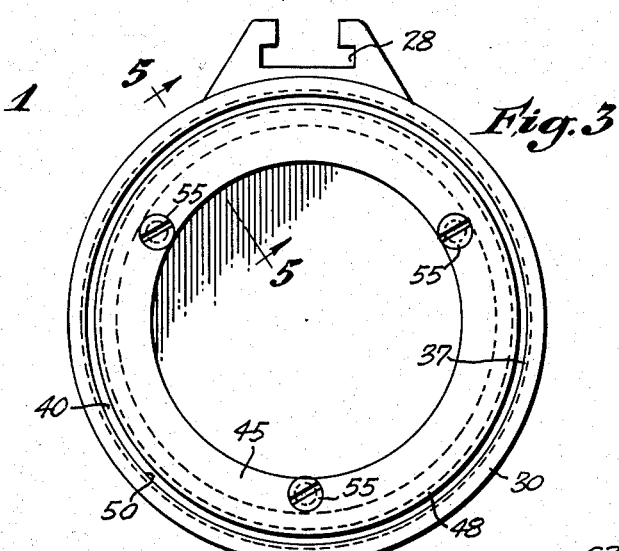
Fig. 3 is a face view of the wedge, O-ring, retainer ring unit.

Referring first to Fig. 1, the present improvements are herein shown as embodied in a gate valve having a usual valve body 10 provided with a flow passage 11. At its center portion, the body 10 has an upper compartment 12 communicating with the flow passage 11. At the sides of the compartment 12, the body is provided with seat rings 13 which are disposed in upwardly diverging relation, these rings being provided with ground and lapped, valve faces 15 inclined in opposite directions relative to the axis of passage 11.

Attached to the upwardly projecting portion 16 of the valve body 10 is a bonnet 17 providing a bearing 18 at its upper end in which is arranged for vertical sliding movement a stem 20 having an upper threaded end. A packing and gland means 21 is provided for sealing around the stem 20. A yoke 22 projecting above the bonnet 17 rotatably mounts a threaded sleeve or nut 23, this element engaging the thread of the stem 20 and being held against axial movement. The sleeve 23 carries a handwheel 25 which, when rotated, slides the stem 20 vertically.

The lower end of the stem 20 has a head 27 which engages in a T-slot 28 formed at the upper end of a wedge member 30. The wedge member 30 forming an element of the present invention, is circular and has tapered faces which diverge upwardly, the angle of inclination of said faces corresponding exactly with that of the annular valve faces 15 of the valve body 10.

Figures 4, 7:
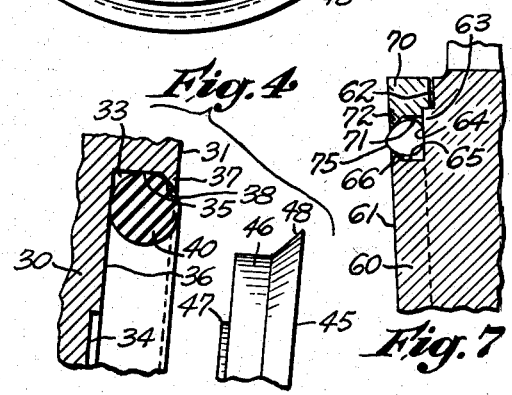
Fig. 4 is a fragmentary composite view, in enlarged scale, of the wedge, O-ring and retainer ring in partly assembled relationship.
Fig. 7 is a cross-sectional view of the peripheral portion of a valving member embodying a sealing means of alternative construction.
Figure 2:
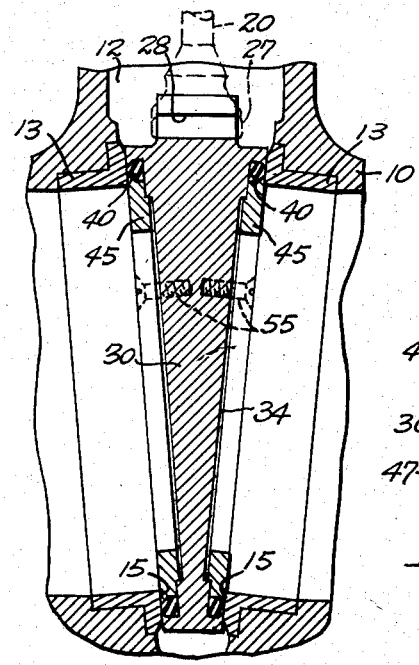
Fig. 2 is an enlarged, longitudinal sectional view of the wedge, O-ring seal and associated parts of the gate valve.

Turned in the faces 31 of the wedge member 30 are circular recesses 33, each recess having a stepped-down central portion 34. Each recess 33 provides an outer cylindrical surface 35 and a bottom surface 36. At the juncture of the surface 35 and the face 31 is an integral, inwardly-directed lip 37 which, as shown, provides a frusto-conical surface 38. As shown in Fig. 4, the recess 33 is adapted to receive an O-ring 40. As illustrated, the O-ring has a cross-sectional diameter which is greater than the depth of the recess 33. When the O-ring 40 is in place in the recess, it rests against the bottom surface 36 and a portion of its periphery underlies the lip 37.

The wedge assembly also includes a pair of retainer elements in the form of rings 45, one for each face of the wedge member. Each retainer ring 45 has a body portion 46 of a diameter slightly less than the inside diameter of the O-ring 40. The ring 45 has a small central locating or centering portion 47 adapted to be received in the shallow central portion 34 of the recess 33. At its outer side, each retainer ring 45 has a frusto-conical flange or lip 48.

Figures 5, 6:
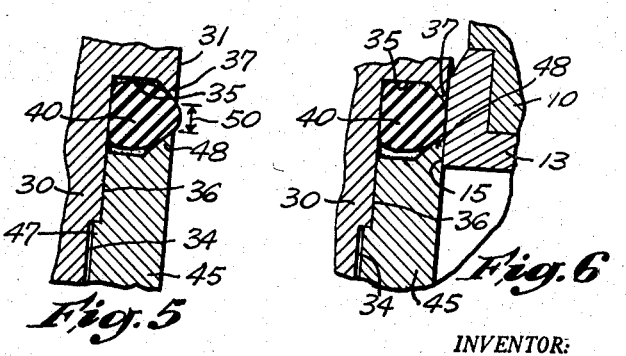
Fig. 5 is a cross-sectional view, taken on line 5—5 of Fig. 3.
Fig. 6 is a view similar to Fig. 5, showing the O-ring seal compressed within the groove when the wedge member is in valve-closing position.

Each retainer ring 45 is insertable bodily into a recess 33 in position to cause its locating portion 47 to enter the central portion 34 and to cause the inner side of the body portion 46 to abut the bottom surface 36 of the recess. During insertion of the retainer ring 45, its body portion 46 is located within the O-ring 40 as shown in Fig. 5. With the retainer ring in place, there is provided an annular groove, the outer side of which is defined by the inner surface 35 of the recess 33. The inner side of the groove is formed by the periphery of the body portion 46 of the retainer ring 45 while the bottom of the groove is provided by the bottom surface 36 of the recess.

It is to be noted by reference to Fig. 5 that the inwardly and outwardly-directed lips 37 and 48 of the wedge member 30 and retainer ring 45, respectively, provide between them a relatively narrow, annular opening or slot 50, the width of which preferably is somewhat less than one-half the diameter of the O-ring. Since the depth of the groove is less than the cross-sectional diameter of the O-ring, the outer portion of the O-ring projects outwardly through the annular slot 50 as shown in Fig. 5. Engagement of the lips 37 and 48 against the O-ring distorts the cross-sectional shape of the latter within the groove, the O-ring being compressed lightly between the lips and the bottom surface of the groove.

Each retainer ring 45 is secured in place against a side of the wedge member 30 by any suitable fastening or securing means, such as, for example, screws 55 which pass through holes in the retainer ring and are screwed into threaded holes in the wedge member. During manufacture of the wedge, O-ring, retainer ring unit, the retainer rings 45 are secured to the wedge member, after which each tapered surface of the wedge and the corresponding outer surface of the retainer ring are simultaneously ground and lapped to provide a true, coplanar and coextensive valve face at each side of the wedge.

When the wedge element is lowered into valve-closing position, its valve faces seat with metal-to-metal contact against the corresponding inclined, annular valve faces 15 of the body 10. At the same time, engagement of the O-rings 40 against the faces 15 may cause slight further compression of the O-rings within the wedge member 30 as illustrated in Fig. 6. The inherent resiliency of the O-rings causes the latter to engage against the valve faces 15. In addition, fluid pressure acts against the O-ring 40 to distort the same as shown in Fig. 6, that is, to resiliently wedge the O-ring into the juncture occurring between the face 15 and lip 37 so as to provide a positive seal for preventing leakage of fluid between the valve faces of the wedge and body.

When it is desired to open the valve, the wedge member 30 is raised by means of the stem 20 and handwheel 25. As the wedge 30 is drawn upwardly, the valve faces of the wedge and body are separated and the O-rings 40 again project outwardly through the annular openings 50 as shown in Fig. 5. Since the O-rings 40 are positively locked within their grooves by reason of the overlying lips 37 and 48, force of the pressure fluid within the line which might tend to dislodge the O-rings from the grooves is effectively resisted by the lips so that displacement of the O-rings is prevented. That is to say, since the O-rings 40 are locked within the annular grooves and held in compression therein, the possibility of pressure fluid acting between the bottom of the grooves and the inner sides of the O-rings to force the latter outwardly is resisted. This constitutes an important improvement over other valves wherein the resiliency of the O-rings is relied upon to retain them in their grooves, the pressure fluid entering the grooves as the wedge member is raised to cause the O-rings to blow or pop out from the grooves. Thus, where the O-ring seal is incorporated in a high pressure valve employing a wedge member, the specific groove-forming and retainer means is highly practical and efficient. Since the sealing rings, when compressed, remain entirely within their grooves, lateral deformation or pinching thereof between the valve faces of the wedge and body is wholly avoided so that the O-rings will last almost indefinitely.

While I have herein disclosed the improved O-ring sealing means as applied to use in connection with the wedge member of a gate valve, it will be apparent that the sealing means may be embodied in various types of valves. For example, the sealing ring and its retainer means may be employed with equal advantage on the movable valving members of globe valves, orifice fittings, etc., where fluid pressure, acting against opposite sides of an O-ring seal, would ordinarily cause displacement of the O-ring from its groove in a face of the valving member.

Referring now to Fig. 7, it is also within the present concept to provide a valving member 60 of the alternative construction shown therein. In this embodiment of the invention, the valving member has its side surface 61 machined to provide an annular recess 62 adjacent the periphery of the member. The bottom of the recess is stepped to provide a centering portion or boss 63. Radially inwardly of the boss 63, the recess has a flat bottom surface 64 extending parallel to the side surface. The recess 62 also has a cylindrical surface 65 which terminates adjacent the side surface 61 in a small lip or flange 66 having an inner tapered surface.

Secured against the flat bottom surface of the recess 62 is an outer retainer ring 70 having a shallow groove in its inner face receiving the centering boss 63 to locate the ring concentrically of the valving member. The retainer ring 70 has an inner cylindrical surface 71 merging into a small radially inwardly projecting lip 72 having an inner tapered surface.

With the retainer ring 70 in place on the valving member 60, the tapered surfaces of the lips 66, 72 and the surfaces 64, 65, 71 cooperate in defining an annular groove in which a resilient O-ring seal 75 is held in place by reason of the lips 66 and 72. As in the embodiment of Figs. 1 to 6, the lips define between them an annular opening through which a small portion of the O-ring 75 projects to engage against the annular seat or valving face of the valve in which the valving member is employed. It is thus seen that the structure illustrated in Fig. 7 is similar to that shown in Figs. 1 to 6 with the exception that the retainer ring 70 defines the outer portion of the O-ring groove rather than the inner portion thereof. It will be apparent that the retainer ring 70 may be secured to the valving member by means of screws as in the embodiment of Figs. 1 to 6. If preferred, the ring 70 may be provided with internal screw threads at its rearward side to adapt it to be screwed onto external threads provided at the step or shoulder occuring between the surfaces 63 and 64.

In accordance with the provisions of the patent statutes, I have herein described the principle of the invention, together with the structures which I now consider to represent the best embodiments of the invention. I wish to have it understood, however, that various modifications might be made in the structure without departing from the spirit or scope of the invention, as defined in the appended claims.

I claim as my invention:

1. A sealing valving member unit for use in a gate valve having a body, a flow passage in the body and an annular valve seating face surrounding the flow passage and inclined slightly less than 90 degrees to the axis of said flow passage, comprising: a valving member having a side face disposed for metal-to-metal sealing engagement against said valve seating face, means operable from the exterior of said valve body for moving said valve member out of and into seating engagement with said valve seating face under pressure, said side face having an annular recess therein provided with a bottom surface, an outer cylindrical surface and a lip at the intersection of said cylindrical surface and said side face, said lip projecting radially inwardly in overlying, spaced relation to said bottom surface; a compressible O-ring of larger cross-sectional diameter than the depth of said recess, said O-ring seating against said bottom surface; and a retainer element secured within said recess and having a peripheral lip arranged in overlying, spaced relation to said bottom surface and engaging a portion of said O-ring, said bottom surface, said cylindrical surface, said retainer element and said lips together defining an annular groove in which said O-ring is disposed, there being an annular opening between said lips through which a portion of the compressed O-ring projects outwardly beyond said side face, and said recess having a cross-sectional area in excess of the cross-sectional area of said O-ring and being effective to accommodate said O-ring when said valving member is fully closed in direct metal-to-metal seating engagement under pressure against said valve seating face, the outer diameter of said O-ring being slightly smaller than the outer diameter of said recess, and the inner diameter of the O-ring being exposed to high pressure side of said valve whereby the high pressure fluid is effective to expand said O-ring outwardly into resilient high-pressure sealing contact with the outer side of said recess and across the interface between said metal-to-metal sealing valve members.

2. A valving means for use in a valve body having a fluid flow passage therein and an annular valve seating face surrounding said passage and inclined slightly less than 90 degrees to the axis of said flow passage, comprising: a valving member having a seating face for metal-to-metal sealing engageable against the face of a valve seating member for shutting off the flow of fluid through the passage, means for opening and closing said valving member into high pressure metal-to-metal sealing engagement with said seating member, one of said members having an annular recess in its said face providing a bottom surface, an outer cylindrical surface and a radially inwardly projecting lip overlying said bottom surface in spaced relation thereto; a compressible O-ring for seating in said recess and engageable against said bottom surface with said lip overlying and engaging an outer portion of the O-ring, said O-ring having a cross-sectional diameter greater than the depth of said recess so that a portion of the O-ring projects outwardly beyond the face of said valving member and being adapted when stretched to lie against said cylindrical surface; and a retainer element securable in said recess and within said O-ring, said retainer element having a peripheral lip overlying and engaging an outer portion of said O-ring, said bottom surface, cylindrical surface and periphery of said retainer element together defining an annular groove in which said O-ring is seated, said lips confining and lightly compressing said O-ring in said groove, there being an annular opening between said lips of a width substantially less than the cross-sectional diameter of the O-ring through which the outer portion of the O-ring projects, said O-ring having a cross-sectional area less than the cross-sectional area of said recess to accommodate said O-ring when said valving member is fully closed with its face in direct metal-to-metal engagement with said seating valve face, and the inner diameter of the O-ring being exposed to the high pressure side of said valve whereby said pressure is effective to expand said O-ring into high pressure sealing contact with the cylindrical surface of said recess and across the interface between said metal-to-metal sealing members.

3. A gate valve adapted for use in controlling flow in large-diameter high-pressure fluid lines, said valve comprising a body having a pair of aligned passages, means forming a bonnet chamber opening laterally into said body for the full width thereof, a valve plate having converging opposite faces, a pair of valve seating rings encompassing said flow passage and supported by said body with their seating faces accurately parallel to the juxtaposed faces of said valve plate, the juxtaposed annular faces of said rings and of said plate being precisely ground and lapped and in high pressure continuous metal-to-metal contact when said valve is forcibly pressed into its closed position, one of said seating faces on either side of the valve having a groove therearound provided with a converging entrance and seating therein an O-ring of greater diameter than the depth of the groove but appreciably less in diameter than the internal width of the groove, a threaded stem opening through packing gland means in the wall of said bonnet and having an inner flanged end engageable in a head of a T-slot provided on said valve plate whereby said stem is effective upon rotation to open and close the valve while leaving the latter free to center itself between said seating rings, said stem being operable to seat said valve plate with both faces thereof in high-pressure continuous metal-to-metal contact with juxtaposed surfaces of said seating ring with said O-rings compressed thereagainst to provide a resilient seal supplementing the primary metal-to-metal seal, whereby pressure differentials in excess of many hundreds of pounds acting on either side of said valve plate are directly and rigidly backed by the valve body and are ineffective to relieve in any degree the sealing pressure on the O-ring or on the said primary seal, and the inner diameter side of at least one of said O-rings being exposed directly to the fluid pressure on the high pressure side of said valve whereby said high pressure is effective to expand said one O-ring outwardly into high pressure contact with the cylindrical surface of said groove and across the interface between said metal-to-metal contacting valve plate and the juxtaposed sealing ring.

4. A gate valve adapted to seal against very high pressures, said valve comprising a valve body having aligned flow passages and a lateral opening on one side for a valve plate, a valve plate movably supported for movement between an open position clear of said passage and a closed position sealed thereacross, a seating ring surrounding the high pressure side of said valve, juxtaposed side of said valve having an annular surface adapted to be pressed rigidly under pressure against said seating ring in the closed position thereof, means for closing said seating surfaces tightly together under pressure and in metal-to-metal contact, both of said sealing surfaces being ground and lapped to form precision metal-to-metal face sealing surfaces, a supplemental resilient seal carried by one of said face seal members, said resilient seal being of elastomeric material and being mounted in a groove opening through one of the face seal surfaces, said groove having a transverse outer diameter slightly greater than the outside diameter of said seal when relaxed, said groove having an axial depth less than the axial height of said seal, and the inner radial side of said seal being in communication with the high pressure side of said valve, whereby the high fluid pressure being sealed by said valve is effective to place said sealing ring in elastic hoop tension and to press the same under pressure across the interface between said metal-to-metal face seals.

References Cited in the file of this patent

UNITED STATES PATENTS

| | | |
|---|---|---|
| 1,705,800 | Akeyson | Mar. 19, 1929 |
| 2,224,231 | Mohr | Dec. 10, 1940 |
| 2,401,377 | Smith | June 4, 1946 |
| 2,417,494 | Hoof | Mar. 18, 1947 |
| 2,674,436 | Jones | Apr. 6, 1954 |
| 2,690,360 | Young | Sept. 28, 1954 |
| 2,703,103 | Thibault | Mar. 1, 1955 |
| 2,704,650 | Rand | Mar. 22, 1955 |
| 2,810,542 | Bryant | Oct. 22, 1957 |
| 2,810,543 | Bryant | Oct. 22, 1957 |